(12) United States Patent
Remaley et al.

(10) Patent No.: US 11,054,905 B2
(45) Date of Patent: Jul. 6, 2021

(54) MOTION-RESTRICTING APPARATUS WITH COMMON BASE ELECTRODE

(71) Applicant: Microsoft Technology Licensing, LLC, Redmond, WA (US)

(72) Inventors: Jacquelin Leah Remaley, Redmond, WA (US); James David Holbery, Bellevue, WA (US); Sang Ho Yoon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/422,801

(22) Filed: May 24, 2019

(65) Prior Publication Data

US 2020/0371591 A1 Nov. 26, 2020

(51) Int. Cl.
*G06F 3/01* (2006.01)
*H02N 13/00* (2006.01)

(52) U.S. Cl.
CPC .............. *G06F 3/016* (2013.01); *G06F 3/014* (2013.01); *H02N 13/00* (2013.01)

(58) Field of Classification Search
None
See application file for complete search history.

(56) References Cited

U.S. PATENT DOCUMENTS 2,897,425 A 7/1969 Waring et al.
4,753,442 A * 6/1988 Bland ................ A63B 69/0079
273/330

(Continued)

FOREIGN PATENT DOCUMENTS

CN 100998527 A 7/2007
CN 106726027 A 5/2017
(Continued)

OTHER PUBLICATIONS

Azambuja, Enaie, "Electroadhesive clutch substitutes conventional ones in robotics", Retrieved from: https://www.electronicspecifier.com/robotics/electroadhesive-clutch-substitutes-conventional-ones-in-robotics, Jul. 8, 2016, 5 Pages.
(Continued)

*Primary Examiner* — Fekadeselassie Girma
(74) *Attorney, Agent, or Firm* — Alleman Hall Creasman & Tuttle LLP (57) ABSTRACT

Examples are disclosed that relate to electrostatic clutching mechanisms that may be used for tactile feedback. One example provides a motion-restricting apparatus comprising a wearable base, and an electrostatic clutching mechanism coupled to the base, the electrostatic clutching mechanism comprising a base electrode, a plurality of individually-controllable opposing electrodes arranged at different locations across the base electrode and overlapping the base electrode, and one or more electrically insulating structures configured to electrically insulate the base electrode from the plurality of opposing electrodes. The motion-restricting apparatus further comprises a controller electrically coupled to the base electrode and to each of the opposing electrodes and configured to individually control a voltage applied to each opposing electrode relative to a voltage of the base electrode to control an electrostatic force between the base electrode and each opposing electrode.

19 Claims, 6 Drawing Sheets

(56) References Cited

U.S. PATENT DOCUMENTS

| | | | |
|---|---|---|---|
| 4,987,332 A | 1/1991 | Yamamoto et al. | |
| 5,173,834 A | 12/1992 | Sogoh | |
| 5,184,319 A | 2/1993 | Kramer | |
| 5,429,140 A * | 7/1995 | Burdea | A61B 5/225 600/587 |
| 5,516,249 A * | 5/1996 | Brimhall | B25J 3/04 414/5 |
| 5,631,861 A | 5/1997 | Kramer | |
| 6,128,004 A | 10/2000 | McDowall et al. | |
| 6,413,229 B1 | 7/2002 | Kramer et al. | |
| 6,524,681 B1 | 2/2003 | Seitz et al. | |
| 6,790,308 B2 | 9/2004 | Murphy et al. | |
| 6,809,462 B2 | 10/2004 | Pelrine et al. | |
| 6,966,882 B2 | 11/2005 | Horst | |
| 7,046,151 B2 | 5/2006 | Dundon | |
| 7,056,297 B2 | 6/2006 | Dohno et al. | |
| 7,166,953 B2 | 1/2007 | Heim et al. | |
| 7,250,935 B2 | 7/2007 | Kubota et al. | |
| 7,390,157 B2 | 6/2008 | Kramer | |
| 7,407,895 B2 | 8/2008 | Kunitake et al. | |
| 7,481,782 B2 | 1/2009 | Scott et al. | |
| 7,537,573 B2 | 5/2009 | Horst | |
| 7,545,349 B2 | 6/2009 | Yamada | |
| 7,551,419 B2 | 6/2009 | Pelrine et al. | |
| 7,920,124 B2 | 4/2011 | Tokita et al. | |
| 8,029,414 B2 | 10/2011 | Ingvast et al. | |
| 8,049,772 B2 | 11/2011 | Lipton et al. | |
| 8,058,853 B2 | 11/2011 | Murota | |
| 8,138,895 B2 | 3/2012 | Kato et al. | |
| 8,160,743 B2 | 4/2012 | Birkenbach et al. | |
| 8,164,232 B2 | 4/2012 | Kornbluh et al. | |
| 8,255,079 B2 | 8/2012 | Linn et al. | |
| 8,325,458 B2 | 12/2012 | Prahlad et al. | |
| 8,330,590 B2 | 12/2012 | Poupyrev et al. | |
| 8,362,882 B2 | 1/2013 | Heubel et al. | |
| 8,665,241 B2 | 3/2014 | Heubel et al. | |
| 8,833,826 B2 | 9/2014 | Garcia et al. | |
| 8,860,336 B2 | 10/2014 | Anderson et al. | |
| 8,861,171 B2 | 10/2014 | Prahlad et al. | |
| 8,882,285 B2 | 11/2014 | Walsh | |
| 8,964,351 B2 | 2/2015 | Horinouchi | |
| 8,998,831 B2 | 4/2015 | Sankai | |
| 9,093,926 B2 | 7/2015 | Prahlad et al. | |
| 9,120,220 B2 | 9/2015 | Bergelin et al. | |
| 9,148,074 B2 | 9/2015 | Boughtwood | |
| 9,170,288 B2 | 10/2015 | O'Brien et al. | |
| 9,180,866 B2 | 11/2015 | Helmer et al. | |
| 9,266,233 B2 | 2/2016 | Kornbluh et al. | |
| 9,301,563 B2 | 4/2016 | Hardy et al. | |
| 9,375,382 B2 | 6/2016 | Fausti et al. | |
| 9,401,668 B2 | 7/2016 | Prahlad et al. | |
| 9,403,056 B2 | 8/2016 | Weinberg et al. | |
| 9,403,272 B2 | 8/2016 | Kornbluh et al. | |
| 9,417,693 B2 | 8/2016 | Seth | |
| 9,427,864 B2 | 8/2016 | Kornbluh et al. | |
| 9,529,433 B2 | 12/2016 | Shankar et al. | |
| 9,606,624 B2 | 3/2017 | Cruz-Hernandez et al. | |
| 9,710,060 B2 | 7/2017 | McMillen et al. | |
| 9,846,482 B2 | 12/2017 | Seth | |
| 9,851,082 B2 * | 12/2017 | Thompson | F21L 4/027 |
| 9,921,609 B2 | 3/2018 | Levesque et al. | |
| 9,931,235 B2 * | 4/2018 | Summer | A61F 5/05875 |
| 9,939,468 B1 | 4/2018 | Dyszel | |
| 9,950,422 B2 | 4/2018 | Kornbluh et al. | |
| 9,983,672 B2 | 5/2018 | Olien et al. | |
| 10,012,276 B2 | 7/2018 | Eckerle et al. | |
| 10,013,062 B1 * | 7/2018 | Corson | G06F 3/016 |
| 10,025,387 B2 | 7/2018 | Keller et al. | |
| 10,055,019 B2 | 8/2018 | Beran | |
| 10,055,022 B2 | 8/2018 | Appleyard et al. | |
| 10,082,872 B2 | 9/2018 | Cruz-Hernandez et al. | |
| 10,082,875 B1 * | 9/2018 | Kim | G06F 3/014 |
| 10,104,923 B2 | 10/2018 | Howland et al. | |
| 10,105,839 B2 | 10/2018 | Kornbluh et al. | |
| 10,137,362 B2 | 11/2018 | Buchanan et al. | |
| 10,197,459 B2 | 2/2019 | Keller et al. | |
| 10,228,396 B2 | 3/2019 | Gisby et al. | |
| 10,248,200 B2 | 4/2019 | Cohen et al. | |
| 10,275,025 B2 | 4/2019 | Black et al. | |
| 10,281,982 B2 | 5/2019 | Keller et al. | |
| 10,317,998 B2 | 6/2019 | Holbery et al. | |
| 10,355,624 B2 * | 7/2019 | Majidi | F16D 28/00 |
| 10,366,583 B2 | 7/2019 | Khoshkava et al. | |
| 10,372,213 B2 | 8/2019 | Keller et al. | |
| 10,381,143 B2 | 8/2019 | Khoshkava et al. | |
| 10,423,227 B2 | 9/2019 | Gu | |
| 10,427,293 B2 | 10/2019 | Asbeck et al. | |
| 10,433,367 B2 * | 10/2019 | Pratt | G06F 3/0346 |
| 10,437,335 B2 | 10/2019 | Daniels | |
| 10,466,784 B2 | 11/2019 | Cohen et al. | |
| 10,474,236 B1 | 11/2019 | Stewart et al. | |
| 10,514,759 B2 | 12/2019 | Taylor et al. | |
| 10,521,947 B2 | 12/2019 | Yokokawa | |
| 10,528,138 B2 | 1/2020 | Keller et al. | |
| 10,543,110 B2 | 1/2020 | Piercy et al. | |
| 10,561,565 B2 * | 2/2020 | John | A61B 5/6804 |
| 10,564,722 B2 | 2/2020 | Keller et al. | |
| 10,572,011 B2 * | 2/2020 | Holbery | A63F 13/285 |
| 10,572,014 B2 | 2/2020 | Keller et al. | |
| 10,595,618 B2 | 3/2020 | Wang et al. | |
| 10,603,190 B2 | 3/2020 | Mateus Dias Quinaz | |
| 10,627,783 B2 | 4/2020 | Rothkopf et al. | |
| 10,663,016 B2 | 5/2020 | Schmitz et al. | |
| 10,860,102 B2 | 12/2020 | Remaley et al. | |
| 2002/0130673 A1 | 9/2002 | Pelrine et al. | |
| 2003/0125781 A1 | 7/2003 | Dohno et al. | |
| 2004/0084261 A1 | 5/2004 | Burgoon et al. | |
| 2004/0102723 A1 | 5/2004 | Horst | |
| 2004/0174337 A1 * | 9/2004 | Kubota | G06F 3/016 345/156 |
| 2005/0012485 A1 | 1/2005 | Dundon | |
| 2006/0004307 A1 | 1/2006 | Horst | |
| 2006/0094989 A1 | 5/2006 | Scott et al. | |
| 2006/0115348 A1 | 6/2006 | Kramer | |
| 2006/0152098 A1 | 7/2006 | Horst et al. | |
| 2006/0261516 A1 | 11/2006 | Kunitake et al. | |
| 2007/0016265 A1 | 1/2007 | Davoodi et al. | |
| 2007/0129846 A1 | 6/2007 | Birkenbach et al. | |
| 2007/0195482 A1 | 8/2007 | Muka et al. | |
| 2008/0059131 A1 | 3/2008 | Tokita et al. | |
| 2008/0089002 A1 | 4/2008 | Pelrine et al. | |
| 2008/0153590 A1 | 6/2008 | Ombrellaro et al. | |
| 2009/0102620 A1 | 4/2009 | Kato et al. | |
| 2010/0007240 A1 | 1/2010 | Kornbluh et al. | |
| 2010/0041521 A1 | 2/2010 | Ingvast et al. | |
| 2010/0045251 A1 | 2/2010 | Murota | |
| 2010/0085169 A1 | 4/2010 | Poupyrev et al. | |
| 2010/0141407 A1 | 6/2010 | Heubel et al. | |
| 2010/0318006 A1 | 12/2010 | Horst | |
| 2011/0071664 A1 | 3/2011 | Linn et al. | |
| 2011/0101823 A1 | 5/2011 | Anderson et al. | |
| 2011/0187637 A1 * | 8/2011 | Nichols | A63F 13/212 345/156 |
| 2011/0193362 A1 | 8/2011 | Prahlad et al. | |
| 2011/0234414 A1 | 9/2011 | Ojeda et al. | |
| 2012/0029399 A1 * | 2/2012 | Sankai | A61B 5/6812 601/40 |
| 2012/0053498 A1 | 3/2012 | Horst | |
| 2012/0086366 A1 | 4/2012 | Anderson et al. | |
| 2012/0109025 A1 | 5/2012 | Weinberg et al. | |
| 2012/0154974 A1 | 6/2012 | Bhatnagar et al. | |
| 2012/0182720 A1 | 7/2012 | Walsh | |
| 2013/0010398 A1 | 1/2013 | Prahlad et al. | |
| 2013/0072829 A1 | 3/2013 | Fausti et al. | |
| 2013/0155020 A1 | 6/2013 | Heubel et al. | |
| 2013/0226350 A1 | 8/2013 | Bergelin et al. | |
| 2013/0242455 A1 | 9/2013 | Prahlad et al. | |
| 2013/0285577 A1 | 10/2013 | O'brien et al. | |
| 2013/0294875 A1 | 11/2013 | Prahlad et al. | |
| 2013/0330162 A1 | 12/2013 | Horinouchi | |
| 2014/0035306 A1 | 2/2014 | Garcia et al. | |
| 2014/0162598 A1 * | 6/2014 | Villa-Real | G06Q 20/363 455/411 |
| 2014/0215684 A1 | 8/2014 | Hardy et al. | |

(56) References Cited

U.S. PATENT DOCUMENTS

| | | |
|---|---|---|
| 2014/0277739 A1 | 9/2014 | Kornbluh et al. |
| 2014/0352161 A1* | 12/2014 | Ranieri ................ G01C 15/004 33/291 |
| 2015/0123647 A1 | 5/2015 | Gisby et al. |
| 2015/0132974 A1* | 5/2015 | Kapella .................. H01R 33/92 439/8 |
| 2015/0266180 A1 | 9/2015 | Kornbluh et al. |
| 2015/0266181 A1 | 9/2015 | Kornbluh et al. |
| 2015/0321339 A1 | 11/2015 | Asbeck et al. |
| 2016/0004308 A1 | 1/2016 | Cruz-hernandez et al. |
| 2016/0025459 A1 | 1/2016 | Kwint et al. |
| 2016/0030835 A1* | 2/2016 | Argiro .................... G06F 3/044 463/33 |
| 2016/0070347 A1* | 3/2016 | McMillen ............... G06F 3/014 345/173 |
| 2016/0101516 A1 | 4/2016 | Kornbluh et al. |
| 2016/0101517 A1 | 4/2016 | Kornbluh et al. |
| 2016/0115707 A1* | 4/2016 | Schneider ............... E04H 15/32 135/120.3 |
| 2016/0120734 A1 | 5/2016 | Ishikawa et al. |
| 2016/0124548 A1 | 5/2016 | Cherif et al. |
| 2016/0162022 A1* | 6/2016 | Seth ........................ G06F 3/017 345/156 |
| 2016/0187973 A1 | 6/2016 | Shankar et al. |
| 2016/0187977 A1 | 6/2016 | Cruz-hernandez et al. |
| 2016/0209448 A1 | 7/2016 | Currie et al. |
| 2016/0213548 A1 | 7/2016 | John et al. |
| 2016/0224115 A1* | 8/2016 | Olien ................. G06F 3/04883 |
| 2016/0259417 A1 | 9/2016 | Gu |
| 2016/0278948 A1 | 9/2016 | Piercy et al. |
| 2016/0313630 A1* | 10/2016 | Elmohtaseb ......... G03B 17/561 |
| 2016/0342207 A1 | 11/2016 | Beran |
| 2016/0361179 A1* | 12/2016 | Mateus Dias Quinaz ................... A61F 2/72 |
| 2016/0363887 A1 | 12/2016 | Nodera et al. |
| 2016/0363997 A1 | 12/2016 | Black et al. |
| 2016/0378071 A1 | 12/2016 | Rothkopf |
| 2017/0014111 A1 | 1/2017 | Hulseman et al. |
| 2017/0038839 A1 | 2/2017 | Seth |
| 2017/0055596 A1 | 3/2017 | Colby et al. |
| 2017/0061753 A1 | 3/2017 | Khoshkava et al. |
| 2017/0131769 A1 | 5/2017 | Keller et al. |
| 2017/0131770 A1 | 5/2017 | Keller et al. |
| 2017/0160807 A1 | 6/2017 | Keller et al. |
| 2017/0165567 A1 | 6/2017 | Walters |
| 2017/0168375 A1* | 6/2017 | Lajoie .................... F16M 11/16 |
| 2017/0168565 A1 | 6/2017 | Cohen et al. |
| 2017/0176267 A1 | 6/2017 | Keller et al. |
| 2017/0185152 A1 | 6/2017 | Keller et al. |
| 2017/0210302 A1* | 7/2017 | Le ........................ B60R 11/0241 |
| 2017/0212589 A1 | 7/2017 | Domenikos et al. |
| 2017/0222576 A1* | 8/2017 | Majidi .................... H02N 13/00 |
| 2017/0235213 A1* | 8/2017 | Clearman ............... F16M 11/22 396/428 |
| 2017/0248272 A1 | 8/2017 | Ullrich et al. |
| 2017/0273374 A1 | 9/2017 | Howland et al. |
| 2017/0319950 A1* | 11/2017 | Buchanan, IV ......... A63F 13/40 |
| 2017/0371416 A1* | 12/2017 | Zeitler .................... G06F 3/014 |
| 2018/0039302 A1 | 2/2018 | Levesque et al. |
| 2018/0055713 A1 | 3/2018 | Cromie et al. |
| 2018/0056104 A1 | 3/2018 | Cromie et al. |
| 2018/0077976 A1 | 3/2018 | Keller et al. |
| 2018/0081436 A1 | 3/2018 | Keller et al. |
| 2018/0081437 A1 | 3/2018 | Taylor et al. |
| 2018/0081439 A1 | 3/2018 | Daniels |
| 2018/0098583 A1 | 4/2018 | Keller et al. |
| 2018/0107277 A1* | 4/2018 | Keller .................... G06F 3/016 |
| 2018/0140441 A1* | 5/2018 | Poirters .................. A61F 2/54 |
| 2018/0143687 A1* | 5/2018 | Moessinger ............ F16D 28/00 |
| 2018/0151281 A1 | 5/2018 | Khoshkava et al. |
| 2018/0153722 A1 | 6/2018 | Cromie et al. |
| 2018/0196515 A1* | 7/2018 | Appleyard .............. G06F 3/011 |
| 2018/0258562 A1* | 9/2018 | Fukuhara .............. D03D 1/0088 |
| 2018/0260052 A1 | 9/2018 | Karagozler |
| 2018/0311570 A1* | 11/2018 | Buchanan ............... A63F 13/24 |
| 2018/0314334 A1 | 11/2018 | Appleyard et al. |
| 2018/0319020 A1 | 11/2018 | Prahlad et al. |
| 2018/0324896 A1 | 11/2018 | Pratt et al. |
| 2018/0335841 A1* | 11/2018 | Rubin ..................... G06F 3/016 |
| 2018/0361566 A1 | 12/2018 | Kornbluh et al. |
| 2018/0368559 A1 | 12/2018 | Wang et al. |
| 2018/0373331 A1* | 12/2018 | Holbery ................... H02K 7/14 |
| 2019/0004602 A1* | 1/2019 | Holbery .................. G06F 1/163 |
| 2019/0101981 A1* | 4/2019 | Elias ..................... A63F 13/211 |
| 2019/0101983 A1 | 4/2019 | Cohen et al. |
| 2019/0102927 A1 | 4/2019 | Yokokawa |
| 2019/0176320 A1 | 6/2019 | Smith et al. |
| 2019/0204921 A1 | 7/2019 | Goupil et al. |
| 2019/0209086 A1* | 7/2019 | Huang ................. A61B 5/1125 |
| 2019/0247050 A1* | 8/2019 | Goldsmith ........ A61B 17/00491 |
| 2019/0282131 A1 | 9/2019 | Chang et al. |
| 2019/0283247 A1 | 9/2019 | Chang et al. |
| 2019/0339773 A1* | 11/2019 | Holbery .................. G06F 3/011 |
| 2019/0343707 A1* | 11/2019 | Riener .................... A61H 1/024 |
| 2019/0346938 A1 | 11/2019 | Wang et al. |
| 2019/0352808 A1* | 11/2019 | Yoon ...................... A41D 1/005 |
| 2020/0012344 A1* | 1/2020 | McMillen ............... G06F 3/016 |
| 2020/0012345 A1* | 1/2020 | Wang ...................... G06F 3/016 |
| 2020/0016363 A1* | 1/2020 | Macri .................... A61M 21/00 |
| 2020/0029635 A1* | 1/2020 | Kiemele ................. G06F 3/014 |
| 2020/0081532 A1* | 3/2020 | Yoon ...................... G06F 3/0383 |
| 2020/0081533 A1* | 3/2020 | Holbery ............... D03D 1/0088 |
| 2020/0170750 A1* | 6/2020 | Coppersmith ......... F16M 11/40 |
| 2020/0371590 A1 | 11/2020 | Remaley et al. |

FOREIGN PATENT DOCUMENTS

| | | |
|---|---|---|
| DE | 102015113827 A1 | 2/2017 |
| EP | 0782843 A2 | 7/1967 |
| EP | 0981423 A2 | 3/2000 |
| EP | 3343325 A1 | 7/2018 |
| FI | 127459 B | 6/2018 |
| FR | 3040803 A1 | 3/2017 |
| GB | 2488760 A | 9/2012 |
| JP | H06126661 A | 5/1994 |
| JP | 2005227111 A | 8/2005 |
| WO | 2005089176 A2 | 9/2005 |
| WO | 2011116357 A2 | 9/2011 |
| WO | 2016012480 A2 | 1/2016 |
| WO | 2016057963 A1 | 4/2016 |
| WO | 2016070078 A1 | 5/2016 |
| WO | 2017199035 A1 | 11/2017 |
| WO | 2018031476 A1 | 2/2018 |
| WO | 2018059737 A1 | 4/2018 |
| WO | 2018122106 A1 | 7/2018 |

OTHER PUBLICATIONS

Holbery, et al., "Electrostatic Slide Clutch with Bidirectional Drive Circuit", Application as Filed in U.S. Appl. No. 15/968,677, filed May 1, 2018, 36 Pages.

Pessina, Laure-Anne, "Ultra-light gloves let users "touch" virtual objects", Retrieved from: https://actu.epfl.ch/news/ultra-light-gloves-let-users-touch-virtual-objects/, Oct. 15, 2018, 3 Pages.

"Non Final Office Action Issued in U.S. Appl. No. 16/123,682", dated Oct. 15, 2019, 32 Pages.

"Final Office Action Issued in U.S. Appl. No. 15/968,677", dated Oct. 21, 2019, 26 Pages.

"International Search Report and Written Opinion Issued in PCT Application No. PCT/US2019/038075", dated Sep. 9, 2019, 12 Pages.

"Dupont LuxPrint 8153", Retrieved From: https://www.dupont.com/content/dam/dupont/products-and-services/electronic-and-electrical-materials/documents/prodlib/8153.pdf, Oct. 2009, 3 Pages.

"Plexus—High Performance VR/AR gloves", Retrieved from: https://web.archive.org/web/20190306150539/http:/plexus.im/, Mar. 6, 2019, 2 Pages.

"Non Final Office Action Issued in U.S. Appl. No. 15/620,672", dated Apr. 29, 2019, 54 Pages.

"Non Final Office Action Issued in U.S. Appl. No. 15/968,677", dated Apr. 29, 2019, 44 Pages.

(56) References Cited

OTHER PUBLICATIONS

Bauer, et al., "Electromechanical Characterization and Measurement Protocol for Dielectric Elastomer Actuators", in Proceedings of SPIE—The International Society for Optical Engineering, vol. 6168, Mar. 20, 2006, 2 Pages.
Bianchi, Matteo, "A Fabric-Based Approach for Wearable Haptics", in Journal of Electronics, vol. 5, Issue 3, Jul. 26, 2017, 14 Pages.
Bolzmacher, et al., "Polymer Based Actuators for Virtual Reality Devices", in Proceedings of SPIE, vol. 5385, Jul. 27, 2004, pp. 281-289.
Cassar, et al., "A Force Feedback Glove Based on Magnetorheological Fluid: Preliminary Design Issues", in Proceedings of 15th IEEE Mediterranean Electrotechnical Conference, May 2010, 7 Pages.
Choi, et al., "Wolverine: A Wearable Haptic Interface for Grasping in VR", in Proceedings of 29th Annual Symposium on User Interface Software and Technology, Oct. 16, 2016, 3 Pages.
Cohen, et al., "Virtual Reality Robotic Telesurgery Simulations using MEMICA Haptic System", in proceedings of the SPIE Smart Structures Conference, vol. 4329, Mar. 5, 2001, 7 Pages.
Delph, et al., "Modeling and Design of a Tendon Actuated Soft Robotic Exoskeletonfor Hemiparetic Upper Limb Rehabilitation", in Proceedings of 37th Annual International Conference of the IEEE Engineering in Medicine and Biology Society (EMBC), Aug. 25, 2015, pp. 3889-3892.
Diller, et al., "A lightweight, Low-Power Electroadhesive Clutch and Spring for Exoskeleton Actuation", in Proceedings of IEEE International Conference on Robotics and Automation, May 16, 2016, 8 Pages.
Diller, Stuart, "Demonstration: Electroadhesive Clutch", Retrieved From: https://www.youtube.com/watch?v=CufiVK76fPQ, Jul. 7, 2016, 2 Pages.
Diller, et al., "Exoskeleton Walking with a Lightweight, low-power Electroadhesive Clutch and Spring", in Proceedings of IEEE International Conference on Robotics and Automation (ICRA), Mar. 2016, 2 Pages.
Frediani, et al., "Wearable Wireless Tactile Display for Virtual Interactions with Soft Bodies", in Journal of Bioengineering and Biotechnology, vol. 2, Article 31, Sep. 2014, 7 Pages.
Gabardi, et al., "A New Wearable Fingertip Haptic Interface for the Rendering of Virtual Shapes and Surface Features", in Proceedings of the IEEE Haptics Symposium, Apr. 8, 2016, pp. 140-146.
Gallego, Jelor, "New Super-Light Exoskeleton Created to Enhance the Human Body", Retrieved From: https://futurism.com/new-super-light-exoskeleton-created-to-enhance-the-human-body, Jul. 20, 2016, 4 Pages.
Heo, et al., "Current Hand Exoskeleton Technologies for Rehabilitation and Assistive Engineering", in International Journal of Precision Engineering and Manufacturing, vol. 13, Issue 5, May 1, 2012, pp. 807-824.
Kumar, et al., "MuJoCo HAPTIX: A Virtual Reality System for Hand Manipulation", in Proceedings of IEEE 15th International Conference on Humanoid Robots (Humanoids), Nov. 3, 2015, 7 Pages.
Lai, Richard, "Dexmo Exoskeleton Glove lets you Touch and Feel in VR", Retrieved From: https://www.engadget.com/2016/08/24/dexmo-exoskeleton-glove-force-feedback/, Aug. 24, 2016.
"International Search Report and Written Opinion Issued in PCT Application No. PCT/US19/028425", dated Jul. 3, 2019, 11 Pages.
"International Search Report and Written Opinion Issued in PCT Application No. PCT/US2017/062119", dated Mar. 12, 2018, 12 Pages.
Schorr, Samuel, "Wearable Skin Deformation Feedback for Force Sensory Substitution in Virtual Reality", Retrieved From: https://web.archive.org/web/20141114233415/https:/www.samuelschorr.com/research.html, Nov. 14, 2014, 8 Pages.
Shintake, et al., "Versatile Soft Grippers with Intrinsic Electroadhesion Based Onmultifunctional Polymer Actuators", in Journal of Advanced Materials, vol. 28, Issue 2, Jan. 2016, pp. 1-28.
Xiloyannis, et al., "Preliminary Design and Control of a Soft Exosuit for Assisting Elbow Movements and Hand Grasping in Activities of Daily Living", in Journal of Rehabilitation and Assistive Technologies Engineering, vol. 4, Jan. 1, 2017, 15 Pages.
Ye, et al., "Force-Sensing Glove System for Measurement of Hand Forces during Motorbike Riding", Retrieved from: http://journals.sagepub.com/doi/full/10.1155/2015/545643, Nov. 29, 2015, pp. 1-9.
Ying, et al., "Visualization Bio-Mimetic Model of Muscular Drive", in Proceedings of IEEE International Symposium on Industrial Electronics, Jun. 4, 2007, 3 Pages.
Zhang, et al., "Dielectric Elastomer Actuators for a Portable Force Feedback Device", in Proceedings of the 4th International Symposium on Haptic Interfaces for Virtual Environment and Teleoperator Systems, Mar. 25, 2006, 8 Pages.
"Final Office Action Issued in U.S. Appl. No. 15/620,672", dated Nov. 26, 2019, 46 Pages.
"International Search Report and Written Opinion Issued in PCT Application No. PCT/US2019/038847", dated Oct. 2, 2019, 11 Pages.
"International Search Report and Written Opinion Issued in PCT Application No. PCT/US2019/038833", dated Nov. 5, 2019, 21 Pages.
"Non Final Office Action Issued in U.S. Appl. No. 15/968,677", dated Apr. 9, 2020, 30 Pages.
"Non Final Office Action Issued in U.S. Appl. No. 16/046,708", dated Mar. 2, 2020, 9 Pages.
"Non Final Office Action Issued in U.S. Appl. No. 16/123,682", dated Apr. 24, 2020, 15 Pages.
"Non Final Office Action Issued in U.S. Appl. No. 16/124,834", dated Mar. 23, 2020, 15 Pages.
"Notice of Allowance Issued in U.S. Appl. No. 16/406,202", dated Apr. 15, 2020, 8 Pages.
"Final Office Action Issued in U.S. Appl. No. 16/046,708", dated Aug. 3, 2020, 11 Pages.
"Notice of Allowance Issued in U.S. Appl. No. 16/123,682", dated Aug. 4, 2020, 11 Pages.
"Non Final Office Action Issued in U.S. Appl. No. 16/422,611", dated Jul. 9, 2020, 7 Pages.
"International Search Report and Written Opinion Issued in PCT Application No. PCT/US2020/026953", dated Jul. 6, 2020, 12 Pages.
Hinchet, et al., "DextrES: Wearable Haptic Feedback for Grasping in VR via a Thin Form-Factor Electrostatic Brake", in Proceedings of the 31st Annual ACM Symposium on user Interface Software and Technology, Oct. 14, 2018, pp. 901-912.
"International Search Report and Written Opinion issued in PCT Application No. PCT/US2020/028379", dated Jul. 31, 2020, 10 Pages.
"Final Office Action Issued in U.S. Appl. No. 16/124,834", dated Sep. 28, 2020, 21 Pages.
"International Search Report and the Written Opinion Issued in PCT Application No. PCT/US2020/028381", dated Jul. 14, 2020, 9 Pages.

* cited by examiner

MOTION-RESTRICTING APPARATUS WITH COMMON BASE ELECTRODE

BACKGROUND

Virtual reality display systems immerse a user in virtual imagery occupying an entire field of view. Augmented reality or mixed reality display systems display virtual objects superimposed with real-world backgrounds, such as via a see-through display. In either case, visual and auditory aspects of a virtual experience may be represented in a lifelike manner.

SUMMARY

Examples are disclosed that relate to electrostatic clutching mechanisms that may be used for tactile feedback. One example provides a motion-restricting apparatus comprising a wearable base, and an electrostatic clutching mechanism coupled to the base, the electrostatic clutching mechanism comprising a base electrode, a plurality of individually-controllable opposing electrodes arranged at different locations across the base electrode and overlapping the base electrode, and one or more electrically insulating structures configured to electrically insulate the base electrode from the plurality of opposing electrodes. The motion-restricting apparatus further comprises a controller electrically coupled to the base electrode and to each of the opposing electrodes and configured to individually control a voltage applied to each opposing electrode relative to a voltage of the base electrode to control an electrostatic force between the base electrode and each opposing electrode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
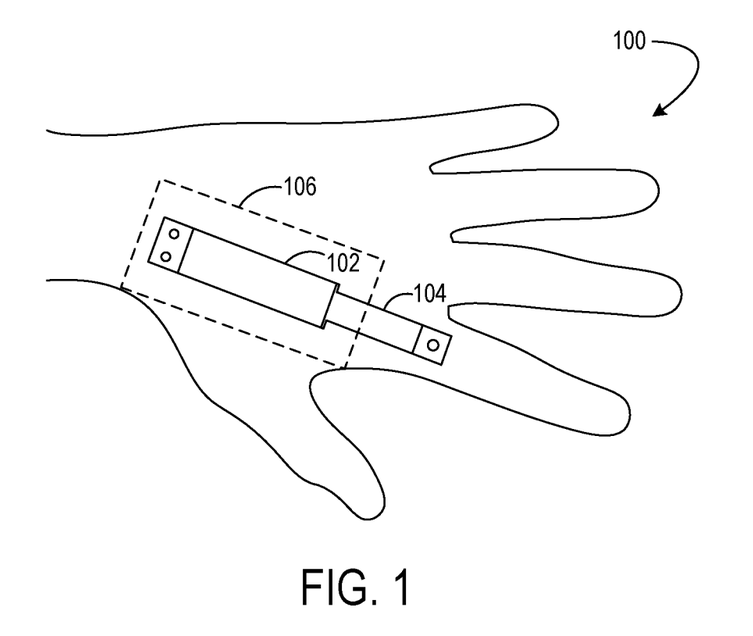
FIG. 1 shows an example electrostatic clutching mechanism for a single finger of a glove.

Experiences provided by virtual and augmented reality display devices may be immersive in the visual and auditory sense, but not in the tactile sense. Thus, to provide haptic feedback for a virtual or augmented reality experience, a wearable device may be used to restrict motion to simulate the resistance felt when an object is touched. Some such motion-restricting devices may utilize electrostatic clutching mechanisms to selectively restrict joint motion. FIG. 1 shows an electrostatic clutch 100 that may be incorporated in a wearable glove structure. Electrostatic clutch 100 includes two multi-layer electrodes 102, 104, such that an applied voltage between the electrodes exerts a resistive force between the two electrodes to selectively control a sliding motion of the electrodes relative to one another. However, the depicted clutch 100 is not able to independently control restrictive forces for more than one finger.

As one possible solution, multiple instances of electrostatic clutch 100 may be arranged in a side-by-side manner to provide independently controllable clutching for more than one finger. However, because a voltage used to actuate the clutch may be dependent upon a surface area of a clutch, relatively wider electrodes may allow the use of lower voltages. Due to the electrode width, a housing 106 that contains the electrodes may be too large to allow side-by-side clutches to be positioned in desired locations with respect to each finger (e.g. along an axis of each finger).

Accordingly, examples are disclosed that relate to an electrostatic clutch arrangement that includes multiple independently controllable electrodes arranged in a compact configuration. Briefly, the disclosed examples utilize an electrode arrangement in which a common base electrode is used for a plurality of individually controllable opposing electrodes. The common base electrode and plurality of individually controllable opposing electrodes may be housed within a common housing, thereby allowing multiple individually controllable electrodes to be positioned side-by-side in locations that align with the axes of corresponding fingers, in example implementations involving a wearable glove. It will be understood that a wearable base supporting such an electrostatic clutch arrangement may be worn alternatively or additionally on the leg, shoulder, neck, or other body part in some examples. In still other examples, an electrostatic clutch arrangement may be used in other electromechanical applications. For example, the clutch may be used to provide positive braking for a servomechanical device (e.g., a robotic, soft robotic, prosthetic, and/or ball-joint).

Figure 2:
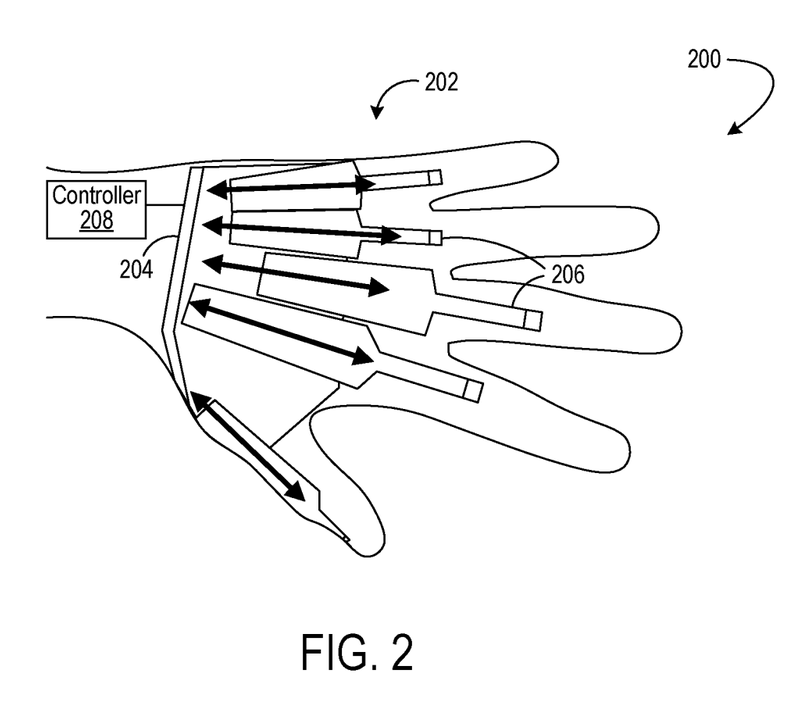
FIG. 2 shows an example electrostatic clutching mechanism for multiple fingers of a glove.

FIG. 2 schematically shows an example wearable glove 200 coupled to a motion restricting apparatus 202 having an electrostatic clutching mechanism including a common base electrode 204 and a plurality of independently-controllable opposing electrodes 206. One opposing electrode is provided for each finger of the glove 200, including the thumb. The base electrode 204 is coupled to the back of the glove 200, while each opposing electrode is coupled to a respective finger of the glove. As described in more detail below, each electrode may comprise multiple electrode layers in some examples, which may help to increase a surface area of each electrode for a given electrode width relative to single-layer electrodes. In such examples, the layers of the base electrode may be interleaved with the layers of each opposing electrode. Further, each electrode may be coated with an electrically insulating (dielectric) material to electrically insulate the opposing electrodes from the base electrode.

A controller 208 is electrically coupled to the base electrode 204 and each of the opposing electrodes 206 to control the voltages applied to each of the base electrode 204 and the opposing electrodes 206. In some examples, an alternating voltage of suitable frequency may be used to facilitate dynamically changing the force applied, as charge may be added to or removed from electrodes by varying a duty cycle, type of waveform, and/or amplitude of the alternating voltage. To ensure that the electrostatic clutching mechanism imparts resistive force at the appropriate time, controller 208 may be communicatively coupled to a computing system, such as a display system, so that actuation of the clutching mechanism is triggered by a detected intersection of a user's hand with a displayed virtual object (e.g. as detected by image sensors, worn and/or stationary, in a use environment).

Figure 3:
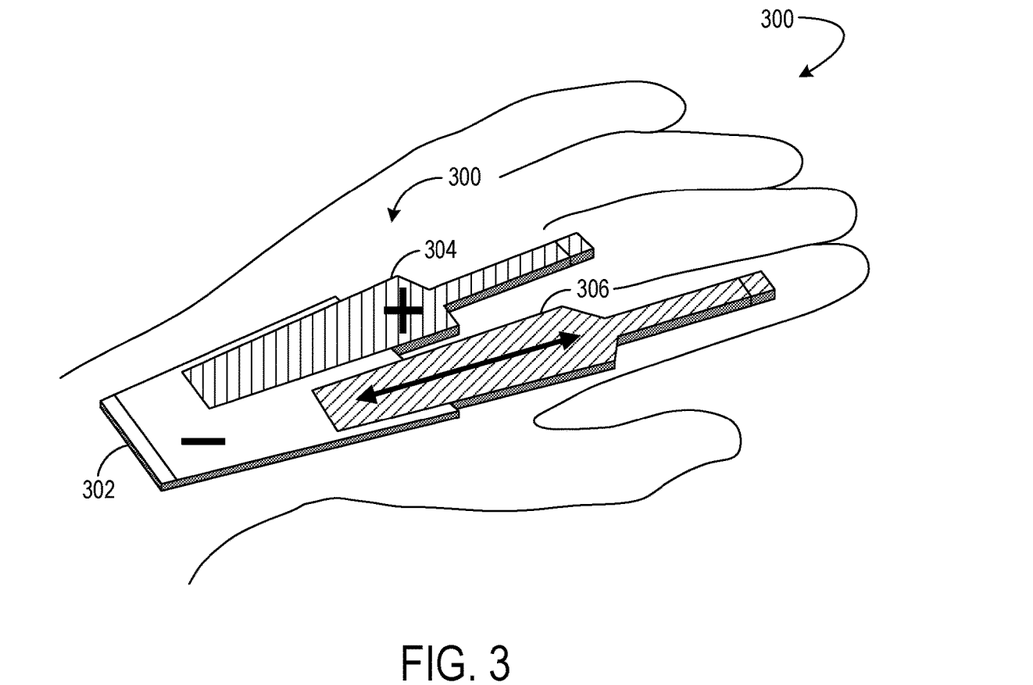
FIG. 3 schematically illustrates operation of an example electrostatic clutching mechanism.

FIG. 3 illustrates an example operation of a motion-restricting apparatus 300 having a base electrode 302 and independently-controllable opposing electrodes 304, 306. In this example, only electrodes for the middle and index fingers are shown for clarity, but electrodes may be provided for any combination of fingers. A voltage is applied to opposing electrode 304 of the middle finger relative to base electrode 302 to bias the opposing electrode 304 relative to the base electrode, thereby restricting motion of opposing electrode 304 relative to base electrode 302, while no bias voltage is applied to opposing electrode 306 of the index finger, allowing opposing electrode 306 to slide relative to base electrode 302.

Figure 4:
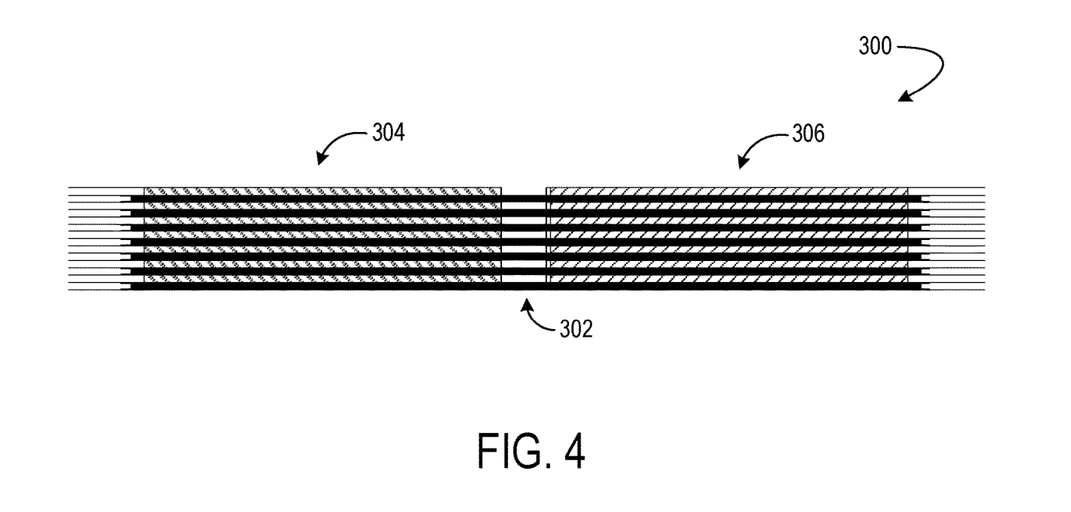
FIG. 4 shows a side sectional view of two opposing electrodes and the base electrode of the electrostatic clutching mechanism of FIG. 3.

As mentioned above, in some examples, each electrode may comprise multiple electrode layers. FIG. 4 shows a sectional side view depicting example electrode layers of base electrode 302 and opposing electrode 304, 306. In this example, each electrode has seven electrode layers, forming an interleaving stack of 14 total layers. Each electrode layer includes an electrical conductor coated with a dielectric material. In a glove that has opposing electrodes for each finger, the electrode layers may be individually addressable by six output pins (one pin for each finger, and one for the common base) of the controller, rather than ten pins in arrangements where separate electrode pairs are used instead of a common base electrode. It will be understood that pins may provide an output to a suitable signal generator/amplifier circuit for generating a voltage (DC or AC) to apply to each electrode.

The individual electrode layers may have any suitable structure. In some examples, each electrode layer may comprise a flexible polymer substrate coated with a suitable electrical conductor (e.g. a thin metal film, such as copper or aluminum), and overcoated with a dielectric material. In other examples, each layer may comprise a conductive core material (e.g. a conductive metal strip, conductive fabric strip, conductive polymer strip, etc.), rather than a conductive thin film formed on a substrate.

The dielectric material may be selected to exhibit a high dielectric strength in order to support a large electric field without dielectric breakdown, and a high dielectric constant to achieve a higher electrostatic force at a given voltage. In some examples, the dielectric material may comprise a homogeneous thin film, such as a polymer of suitable dielectric constant and dielectric strength. In other examples, an electrically insulating structure may comprise a composite material, e.g. a ceramic compound (e.g. barium titanate) contained within a polymer matrix.

Where the electrode is formed from a conductive film formed on a substrate, each electrode layer may be coated on a single side with a conductor and dielectric layer, or on both sides.

Figure 5:
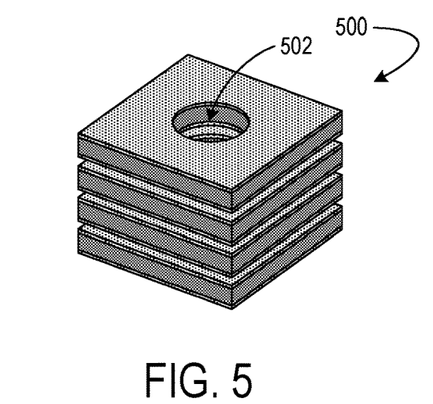
FIG. 5 shows a first example connection between layers of an electrode.
Figure 6:
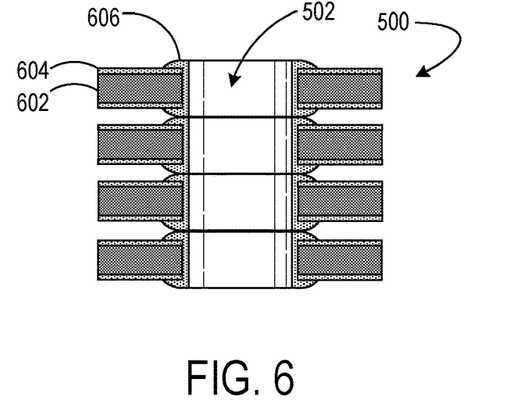
FIG. 6 shows a sectional view of the electrode layers of FIG. 5.

Various structures may be used to mechanically and electrically connect layers of an electrode together. FIG. 5 shows a first example in which a hole 502 is formed through the layers of an electrode, such that a pin can be used to hold the electrode layers in position relative to one another. FIG. 6 shows a side sectional view of the electrode 500, and illustrates each electrode layer as comprising a conductive core 602 coated on both sides with a dielectric material 604. As described above, the core may be formed from a solid conductor, or from a multilayer structure, such as copper or aluminum deposited (e.g. by sputtering, evaporation, etc.) on a polymer core (e.g. polyethylene terephthalate, for example). The dielectric layers are adhered together with a conductive polymer adhesive 606 applied within hole 502, such as a silver epoxy or other suitable material. Conductive polymer adhesive 606 adheres the electrode stack together and also electrically connects the layers so that the layers form a common conductor.

Figure 7:
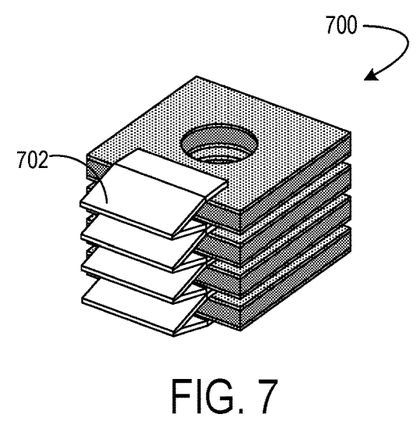
FIG. 7 shows a second example connection between layers of an electrode.
Figure 8:
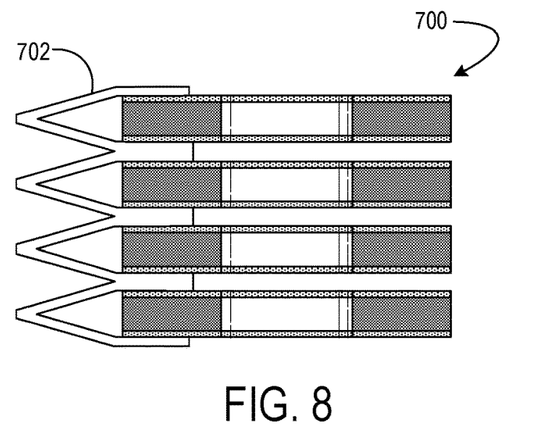
FIG. 8 shows a sectional view of the electrode layers of FIG. 7.

FIGS. 7 and 8 show another example structure to mechanically and electrically connect a plurality of electrode layers. In this example, the electrode layers 700 are crimped at an end via a conductive sheet 702 having a zig-zag shape. In some examples, the conductive sheet 702 may be formed form copper. In other examples, other suitable conductive materials may be used. The electrode may be assembled by placing individual electrode layers between the layers of the metal sheet, and then clamping the metal sheet to crimp the layers together, thereby forming both the mechanical and electrical connections in a same step.

Figure 9:
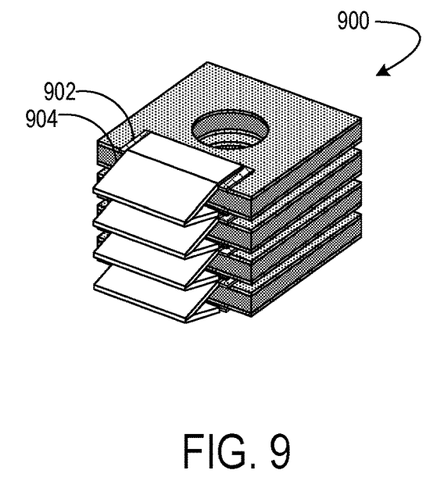
FIG. 9 shows a third example connection between layers of an electrode.
Figure 10:
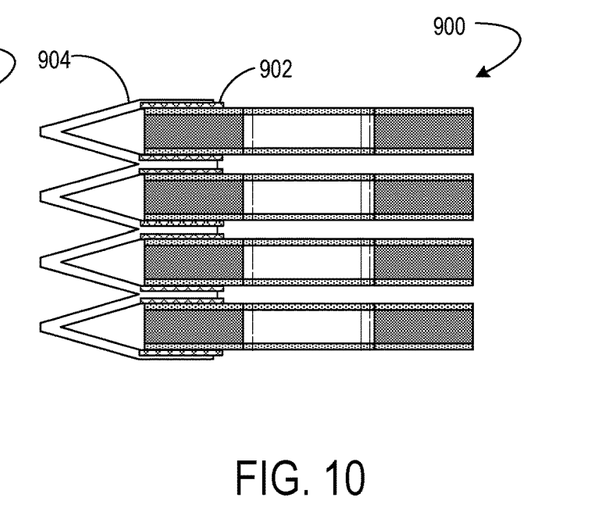
FIG. 10 shows a sectional view of the electrode layers of FIG. 9.

In some examples, the mechanical and electrical connection of the structure of FIGS. 7 and 8 may be made more robust by use of an adhesive material positioned between the conductive sheet and each electrode layer. FIGS. 9 and 10 show an electrode 900 comprising an electrically conductive tape 902 between each electrode layer and the metal sheet 904 to adhere the metal sheet 904 to the electrode layers. The use of such an adhesive also may help to keep the metal sheet in place during construction of the electrode stack.

Figure 11:
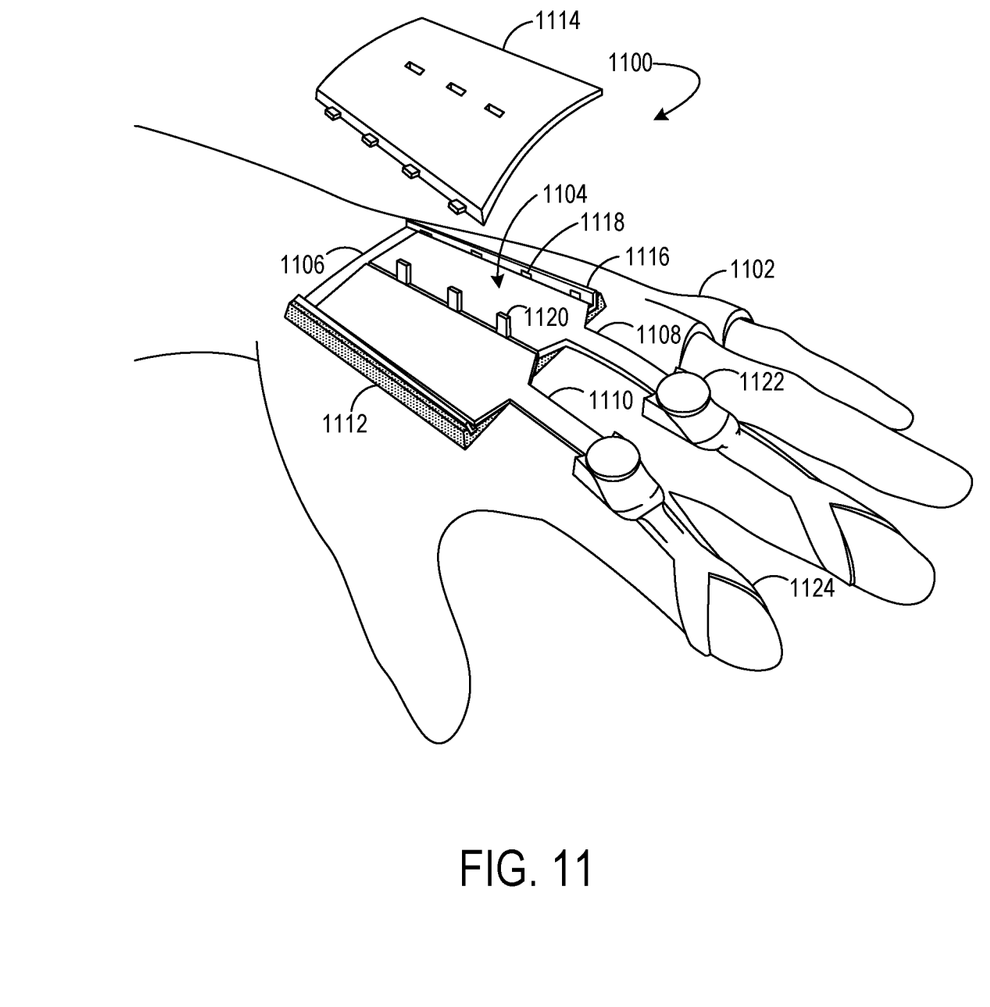
FIG. 11 shows a partial exploded view of an example motion-restricting apparatus.

FIG. 11 shows a partial, exploded view of a motion-restricting apparatus 1100 coupled to a glove 1102. Motion-restricting apparatus 1100 includes an electrostatic clutching mechanism 1104 that includes a base electrode 1106, and opposing electrodes 1108 and 1110 for the middle and index fingers respectively. In other examples, additional opposing electrodes may also be included, e.g. one for every finger, including the thumb. Motion-restricting apparatus 1100 includes a housing 1112 that is coupled to glove 1102 and configured to house base electrode 1106 and at least a portion of each of opposing electrodes 1108, 1110. A top cover 1114 (shown here detached) is configured to cover housing 1112. Inside housing 1112, fastening structures 1116, such as via snap interfaces 1118, may be used to fasten top cover 1114.

Motion-restricting apparatus 1100 further includes dividers 1120 configured to maintain spacing between electrodes 1108 and 1110. As shown by way of example, one or more dividers 1120 may be arranged between electrodes 1108 and 1110, to ensure that the electrodes remain separate when sliding back and forth. Further, dividers 1120 may act as support to add more height to the housing structure and top cover 1114. Such additional clearance in z-height may help contribute to the flexibility of motion-restricting apparatus 1100.

Motion-restricting apparatus 1100 further may include pivots 1122 disposed at the end of the electrodes 1108, 1110 that attach the ends of the electrodes 1108, 1110 to a Y-shaped force transmitter 1124 that transfers force arising from a finger flexing against an actuated clutch to a haptic output located at a pad of a fingertip to provide a sensation of touch. pivot structures 1122 may allow fingers to change angle with respect to the hand without putting undue lateral strain on the electrodes 1108, 1110.

Although not shown here, an electrode configuration for the thumb may differ compared to the electrode configurations for the other fingers due to the opposing position of the human thumb relative to the other fingers. For example, the electrode for the thumb may include one or more pivots configured to allow angular/rotational motion of the thumb. Further, additional dividers, walls, or other internal components and structures may help to guide an electrode for a thumb clutch within a housing.

Figure 12:
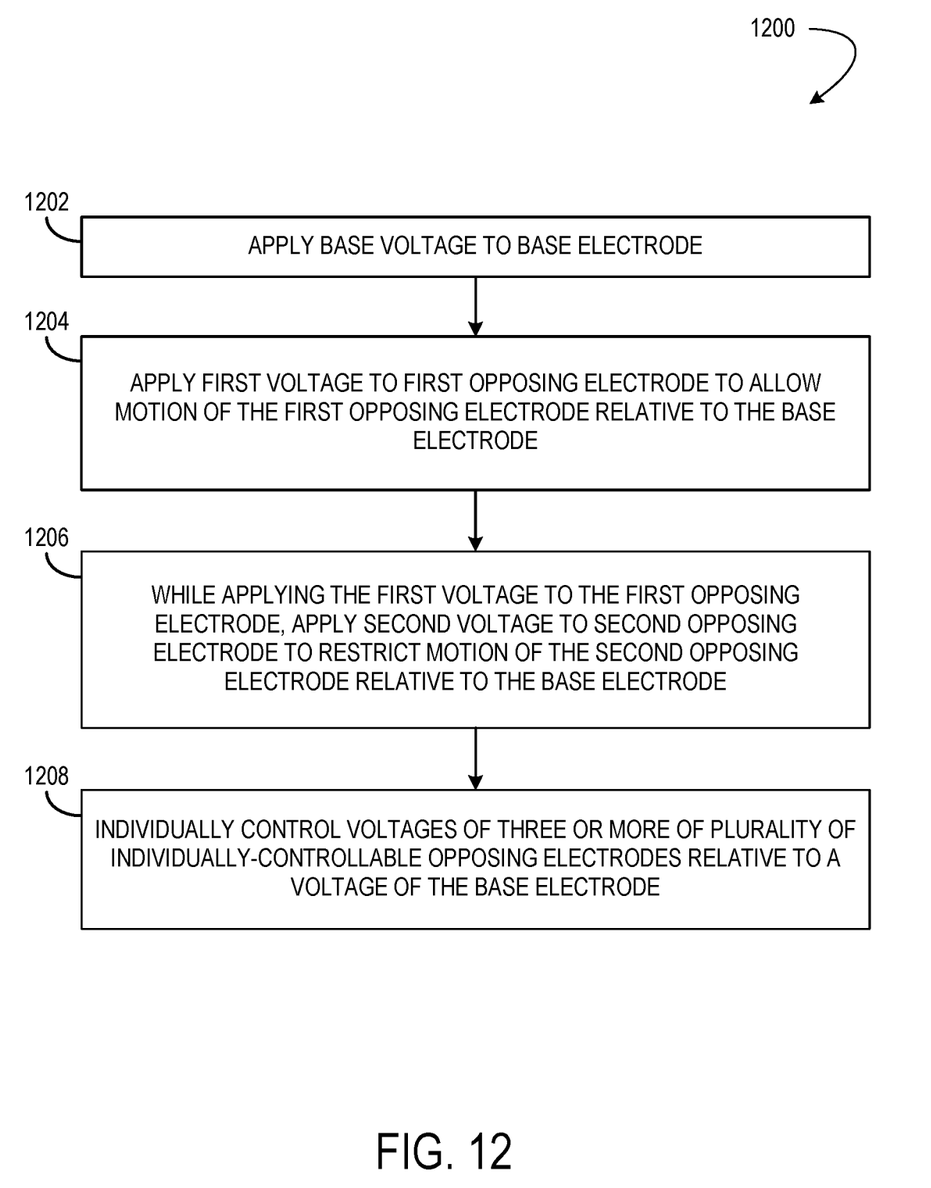
FIG. 12 shows an example method of controlling a motion-restricting apparatus.

FIG. 12 shows a method 1200 of controlling a motion-restricting apparatus having an electrostatic clutching mechanism comprising a common base electrode and a plurality of opposing clutching electrodes. Method 1200 includes, at 1202, applying a first voltage to a base electrode of the electrostatic clutching mechanism. Next, method 1200 includes, at 1204 applying the first voltage to a first opposing electrode to allow motion of the first opposing electrode relative to the base electrode. Method 1200 further includes, at 1206, while applying the first voltage to the first opposing electrode, applying a second voltage to a second opposing electrode to restrict motion of the second opposing electrode relative to the base electrode. In devices having three or more individually-controllable clutching mechanisms, method 1208 further may include, at 1208, individually controlling the voltages of three or more individually-controllable opposing electrodes relative to a voltage of the base electrode. In some examples, applying a voltage may include applying an AC voltage, which may allow a clutching force to be varied by varying a duty cycle, type of waveform, and/or amplitude of the AC voltage applied to the electrode.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
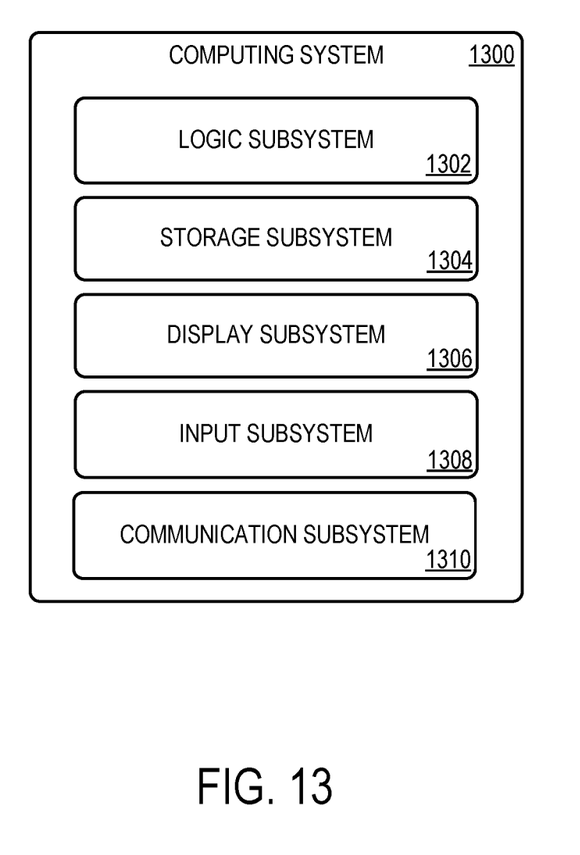
FIG. 13 shows a block diagram of an example computing system.

FIG. 13 schematically shows a non-limiting embodiment of a computing system 1300 that can enact one or more of the methods and processes described above. Computing system 1300 is shown in simplified form. Computing system 1300 may take the form of one or more personal computers, server computers, tablet computers, home-entertainment computers, network computing devices, gaming devices, mobile computing devices, mobile communication devices (e.g., smart phone), and/or other computing devices, such as controller 208.

Computing system 1300 includes a logic subsystem 1302 and a storage subsystem 1304. Computing system 1300 may optionally include a display subsystem 1306, input subsystem 1308, communication subsystem 1310, and/or other components not shown in FIG. 13.

Logic subsystem 1302 includes one or more physical devices configured to execute instructions. For example, logic subsystem 1302 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1302 may include one or more processors configured to execute software instructions. Additionally or alternatively, logic subsystem 1302 may include one or more hardware or firmware logic machines configured to execute hardware or firmware instructions. Processors of logic subsystem 1302 may be single-core or multi-core, and the instructions executed thereon may be configured for sequential, parallel, and/or distributed processing. Individual components of logic subsystem 1302 optionally may be distributed among two or more separate devices, which may be remotely located and/or configured for coordinated processing. Aspects of logic subsystem 1302 may be virtualized and executed by remotely accessible, networked computing devices configured in a cloud-computing configuration.

Storage subsystem 1304 includes one or more physical devices configured to hold instructions executable by the logic machine to implement the methods and processes described herein. When such methods and processes are implemented, the state of storage subsystem 1304 may be transformed—e.g., to hold different data.

Storage subsystem 1304 may include removable and/or built-in devices. Storage subsystem 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1304 may include volatile, nonvolatile, dynamic, static, read/write, read-only, random-access, sequential-access, location-addressable, file-addressable, and/or content-addressable devices.

It will be appreciated that storage subsystem 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1302 and storage subsystem 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1306 may be used to present a visual representation of data held by storage subsystem 1304. This visual representation may take the form of a graphical user interface (GUI). As the herein described methods and processes change the data held by the storage machine, and thus transform the state of the storage machine, the state of display subsystem 1306 may likewise be transformed to visually represent changes in the underlying data. Display subsystem 1306 may include one or more display devices utilizing virtually any type of technology. Such display devices may be combined with logic subsystem 1302 and/or storage subsystem 1304 in a shared enclosure, or such display devices may be peripheral display devices.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

Another example provides a motion-restricting apparatus, comprising a wearable base, and an electrostatic clutching mechanism coupled to the base, the electrostatic clutching mechanism comprising a base electrode, a plurality of individually-controllable opposing electrodes arranged at different locations across the base electrode and overlapping the base electrode, one or more electrically insulating structures configured to electrically insulate the base electrode from the plurality of opposing electrodes, and a controller electrically coupled to the base electrode and to each of the opposing electrodes and configured to individually control a voltage applied to each opposing electrode relative to a voltage of the base electrode to control an electrostatic force between the base electrode and each opposing electrode. The wearable base may additionally or alternatively include a glove, and the plurality of individually-controllable opposing electrodes may additionally or alternatively be associated with fingers of the glove. The motion-restricting apparatus may additionally or alternatively include a housing coupled to the base, wherein the base electrode and at least a portion of each opposing electrode is located within the housing. One of the opposing electrodes may additionally or alternatively be associated with a thumb of the glove. The motion-restricting apparatus may additionally or alternatively include one or more dividers arranged within the housing to maintain spacing between the opposing electrodes. The housing may additionally or alternatively include a top cover covering the base electrode, and the top cover may additionally or alternatively be configured to flex with motion of a body part on which the motion-restricting apparatus is worn. The top cover may additionally or alternatively be configured to attach to the housing via one or more snap interfaces. Each opposing electrode may additionally or alternatively include a plurality of electrode layers at least partially interleaved with a plurality of electrode layers of the base electrode. The electrically insulating structures may additionally or alternatively be conductively connected by a conductive adhesive. The plurality of electrodes may additionally or alternatively be connected via a conductive crimp. The motion-restricting apparatus may additionally or alternatively include conductive tape adhering the conductive crimp to the plurality of electrode layers. The base electrode and the opposing electrodes may additionally or alternatively be flexible.

Another example provides a method of operating a motion-restricting apparatus comprising a base electrode and a plurality of individually-controllable opposing electrodes, the method comprising, applying a first voltage to a first opposing electrode to allow motion of the first opposing electrode relative to the base electrode, and while applying the first voltage to the first opposing electrode, applying a second voltage to a second opposing electrode to restrict motion of the second opposing electrode relative to the base electrode. The method may additionally or alternatively include individually controlling voltages of three or more of the plurality of individually-controllable opposing electrodes relative to a voltage of the base electrode.

Another example provides a motion-restricting apparatus, comprising a glove, and an electrostatic clutching mechanism coupled to the glove, the electrostatic clutching mechanism comprising a base electrode disposed on a back portion of the glove, a plurality of individually-controllable opposing electrodes associated with fingers of the glove, each of the opposing electrodes arranged to overlap the base electrode, and each opposing electrode comprising a plurality of electrode layers at least partially interleaved with a plurality of electrode layers of the base electrode, one or more electrically insulating structures configured to electrically insulate the base electrode from the plurality of opposing electrodes, and a controller electrically coupled to the base electrode and to each of the opposing electrodes and configured to individually control a voltage applied to each opposing electrode relative to a voltage of the base electrode to control an electrostatic force between the base electrode and each opposing electrode. The motion-restricting apparatus may additionally or alternatively include a housing coupled to the glove, wherein the base electrode and at least a portion of each individually-controllable opposing electrode may additionally or alternatively be located within the housing. The motion-restricting apparatus may additionally or alternatively include a plurality of dividers arranged within the housing to maintain spacing between the opposing electrodes. The housing may additionally or alternatively include a top cover covering the base electrode, and wherein the top cover is configured to flex with motion of a body part on which the motion-restricting apparatus is worn. The top cover may additionally or alternatively be configured to attach to the housing via one or more snap interfaces. The base electrode and the opposing electrodes may additionally or alternatively be flexible.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A motion-restricting apparatus, comprising:
a wearable base; and an electrostatic clutching mechanism coupled to the base, the electrostatic clutching mechanism comprising
  a base electrode;
  a plurality of individually-controllable opposing electrodes arranged at different locations across the base electrode and overlapping the base electrode;
  one or more electrically insulating structures configured to electrically insulate the base electrode from the plurality of opposing electrodes, each electrically insulating structure being located between a face of the base electrode and a face of one of the plurality of opposing electrodes;
  one or more dividers each maintaining space between an edge of an opposing electrode and an edge of a laterally adjacent opposing electrode; and
  a controller electrically coupled to the base electrode and to each of the opposing electrodes and configured to control a first voltage applied to a first opposing electrode to allow motion of the first opposing electrode relative to the base electrode while controlling a second voltage applied to a second opposing electrode to restrict motion of the second opposing electrode relative to the base electrode.

2. The motion-restricting apparatus of claim 1, wherein the wearable base comprises a glove, and wherein the plurality of individually-controllable opposing electrodes are associated with fingers of the glove.

3. The motion-restricting apparatus of claim 1, further comprising a housing coupled to the base, wherein the base electrode and at least a portion of each opposing electrode is located within the housing.

4. The motion-restricting apparatus of claim 3, wherein one of the opposing electrodes is associated with a thumb of the glove.

5. The motion-restricting apparatus of claim 3, wherein the housing further comprises a top cover covering the base electrode, and wherein the top cover is configured to flex with motion of a body part on which the motion-restricting apparatus is worn.

6. The motion-restricting apparatus of claim 5, wherein the top cover is configured to attach to the housing via one or more snap interfaces.

7. The motion-restricting apparatus of claim 1, wherein each opposing electrode comprises a plurality of electrode layers at least partially interleaved with a plurality of electrode layers of the base electrode.

8. The motion-restricting apparatus of claim 7, wherein the electrically insulating structures are conductively connected by a conductive adhesive.

9. The motion-restricting apparatus of claim 7, wherein the plurality of electrodes are connected via a conductive crimp.

10. The motion-restricting apparatus of claim 9, further comprising conductive tape adhering the conductive crimp to the plurality of electrode layers.

11. The motion-restricting apparatus of claim 1, wherein the base electrode and the opposing electrodes are flexible.

12. A method of operating a motion-restricting apparatus comprising a base electrode and a plurality of individually-controllable opposing electrodes, each opposing electrode being insulated from the base electrode with an electrically insulating structure located between a face of the base electrode and a face of the opposing electrode, and an edge of the opposing electrode and an edge of a laterally adjacent opposing electrode being separated by a divider, the method comprising:
  applying a first voltage to a first opposing electrode to allow motion of the first opposing electrode relative to the base electrode, and
  while applying the first voltage to the first opposing electrode, applying a second voltage to a second opposing electrode to restrict motion of the second opposing electrode relative to the base electrode.

13. The method of claim 12, further comprising individually controlling voltages of three or more of the plurality of individually-controllable opposing electrodes relative to a voltage of the base electrode.

14. A motion-restricting apparatus, comprising:
  a glove; and
  an electrostatic clutching mechanism coupled to the glove, the electrostatic clutching mechanism comprising
    a base electrode disposed on a back portion of the glove,
    a plurality of individually-controllable opposing electrodes associated with fingers of the glove, each of the opposing electrodes arranged to overlap the base electrode, and each opposing electrode comprising a plurality of electrode layers at least partially interleaved with a plurality of electrode layers of the base electrode,
    one or more electrically insulating structures configured to electrically insulate the base electrode from the plurality of opposing electrodes, each electrically insulating structure being located between a face of the base electrode and a face of one of the plurality of opposing electrodes,
    one or more dividers each maintaining space between an edge of an opposing electrode and an edge of a laterally adjacent opposing electrode, and
    a controller electrically coupled to the base electrode and to each of the opposing electrodes and configured to control a first voltage applied to a first opposing electrode to allow motion of the first opposing electrode relative to the base electrode while controlling a second voltage applied to a second opposing electrode to restrict motion of the second opposing electrode relative to the base electrode.

15. The motion-restricting apparatus of claim 14, further comprising a housing coupled to the glove, wherein the base electrode and at least a portion of each individually-controllable opposing electrode is located within the housing.

16. The motion-restricting apparatus of claim 15, further comprising a plurality of dividers arranged within the housing to maintain spacing between the opposing electrodes.

17. The motion-restricting apparatus of claim 15, wherein the housing further comprises a top cover covering the base electrode, and wherein the top cover is configured to flex with motion of a body part on which the motion-restricting apparatus is worn.

18. The motion-restricting apparatus of claim 17, wherein the top cover is configured to attach to the housing via one or more snap interfaces.

19. The motion-restricting apparatus of claim 14, wherein the base electrode and the opposing electrodes are flexible.

\* \* \* \* \*